United States Patent [19]

Takanashi et al.

[11] Patent Number: 5,031,047

[45] Date of Patent: Jul. 9, 1991

[54] IMAGE INFORMATION PROCESSING METHOD AND APPARATUS THEREOF

[75] Inventors: Itsuo Takanashi, Kamakura; Shintaro Nakagaki, Fujisawa; Hirohiko Shinonaga; Tsutou Asakura, both of Yokohama; Masato Furuya; Tetsuji Suzuki, both of Yokosuka, all of Japan

[73] Assignee: Victor Company of Japan, Ltd., Kanagawa, Japan

[21] Appl. No.: 505,987

[22] Filed: Apr. 6, 1990

Related U.S. Application Data

[63] Continuation-in-part of Ser. No. 301,324, Jan. 24, 1989, Pat. No. 4,956,719.

[30] Foreign Application Priority Data

Apr. 7, 1989 [JP] Japan .................................. 1-89423

[51] Int. Cl.[5] ............................................... H04N 3/14

[52] U.S. Cl. .......................... 358/213.11; 358/213.19

[58] Field of Search ...................... 358/213.11, 213.13, 358/213.19, 209, 228, 217

[56] References Cited

U.S. PATENT DOCUMENTS 3,255,308 6/1966 Walkup .............................. 178/6.6

3,352,967 11/1967 Wiley .................................. 178/6.6

3,577,200 5/1971 Aldrich et al. ................ 358/213.13

3,716,747 2/1973 Patel ............................. 358/213.13

3,723,651 3/1973 Gorog ............................ 178/7.5 D 3,865,975 2/1975 Fletcher et al. ................ 358/213.14

4,015,285 3/1977 Romeas .............................. 358/128

4,641,193 2/1987 Glenn ............................ 358/213.13

4,727,427 7/1988 Kime ................................. 358/217

*Primary Examiner*—Stephen Brinich

*Attorney, Agent, or Firm*—Michael N. Meller

[57] ABSTRACT

There are provided an image information processing method and an apparatus thereof to process information carried by an electro-magnetic radiation beam by means of a photo-to-photo transducer. An intensity of an image information is adjusted by varying the intensity of an electro-magnetic radiation beam used for reading the information as electro-magnetic radiation beam information, which has been recorded on the transducer as a charge image. The electro-magnetic raidation beam information read out from the transducer is inverted by changing an operating range of a photo-modulation layer which is one of the components of the transducer. Furthermore, the electro-magnetic radiation beam information read out from the transducer is nonlinearly processed.

10 Claims, 15 Drawing Sheets

IMAGE INFORMATION PROCESSING METHOD AND APPARATUS THEREOF

This is a continuation-in-part (CIP) application of the U.S. application Ser. No. 301,324 filed on Jan. 24, 1989, now U.S. Pat. No. 4,956,719, issued Sept. 11, 1990.

BACKGROUND OF THE INVENTION

This invention relates to an image information processing method and an apparatus thereof.

A video signal obtained by picking up an optical image of an object can be easily processed by such as editing, trimming and the like. Recording, reproducing and erasing a video signal can also be easily performed. These techniques have been widely used in various fields such as printing, electronic publishing, measuring and the like.

There has been an increased demand for an apparatus capable of imaging and recording an optical information such as a moving picture or an image with a higher resolution when compared to a conventional apparatus.

In a conventional apparatus for obtaining video signals, an optical image of an object picked up with an imaging lens is focussed on a photoelectric conversion section of an image pickup device, and is converted into electric image information which is time sequentially generated as serial video signals. Various image pickup tubes and solid image pickup devices have been used as the image pickup device for such an apparatus.

In order to reproduce images with high quality and resolution, it is necessary for an image pickup apparatus to generate a video signal by which an image of high quality and resolution can be reproduced. However, an image pickup apparatus using an image pickup tube has a limit for minimizing the diameter of an electron beam, and also the target capacity thereof increases as its size becomes large, resulting in a poor resolution. Furthermore, for high resolution moving images, the frequency band of a video signal becomes larger than several tens to hundreds MHz, thus posing a problem of poor 5/N. The above problems have made it difficult to obtain video signals which can reproduce images of high quality and resolution.

Moreover, in order to reproduce images with high quality and resolution by a solid state image pickup device, the device should have many pixels. However, such devices require a high clock frequency to be driven. (The clock frequency for driving the solid state image pickup device for a moving image camera reaches several hundreds MHz.) Furthermore, the capacity of the circuits to be driven inceases accordingly with the increment of the pixels. However, such a solid state image pickup device can not be realized due to the limit of the clock frequency thereof being 20 MHz.

As stated above, conventional image pickup devices could not satisfactorily generate such a video signal to provide reproduced images of high picture quality and high resolution because of the inevitable use of an image sensor for the construction thereof.

There is a demand for an image pickup apparatus to preferably generate a video signal to reproduce an image with high picture quality and high resolution. An instrument is also to be introduced which employs a video signal to record, reproduce and erase an image with high resolution, other than editing, trimming and the like by means of a reversible recording member.

In order to solve the above problems, the assignee of this application has already proposed an image pickup apparatus in which an optical iamge of an object picked up with an imaging lens is focussed on a reversible charge image recording medium on which the optical iamge is recorded and reproduced as a charge image and is erased.

Implementation of such apparatus by the assignee of this application has overcome above problems and proposed recording/reproducing image information with high resolution. However, when such information is converted into time sequential electric signals, the frequency band of the electric signals becomes extemely large. In the case of recording/reproducing an image as the image information with 4000×4000 pixels and converting the information into time sequential electric signals, the frequency band required for the signals becomes about 1 GHz. It is very hard to process image information with large frequency band signals. Therefore, an image information processing method and an apparatus thereof to easily process image information with extemely high resolution has been demanded.

SUMMARY OF THE INVENTION

An object of the present invention is to provide an image information processing method and an apparatus thereof to process information carried by an electromagnetic radiation beam by means of a photo-to-photo transducer (hereinafter abbreviated in a PPC.).

There are provided a method and an apparatus to adjust an intensity of an image information by varying the intensity of an electro-magnetic radiation beam used for reading the information as electro-magnetic radiation beam information, which has been recorded on the PPC as a charge image, to invert the electro-magnetic radiation beam information read out from the PPC by changing an operating range of a photo-modulation layer (hereinafter abbreviated in a PML.) which is one of the components of the PPC and further to nonlinearly process the electro-magnetic radiation beam information read out from the PPC.

DESCRIPTION OF THE PREFERRED EMBODIMENTS

Figure 1:
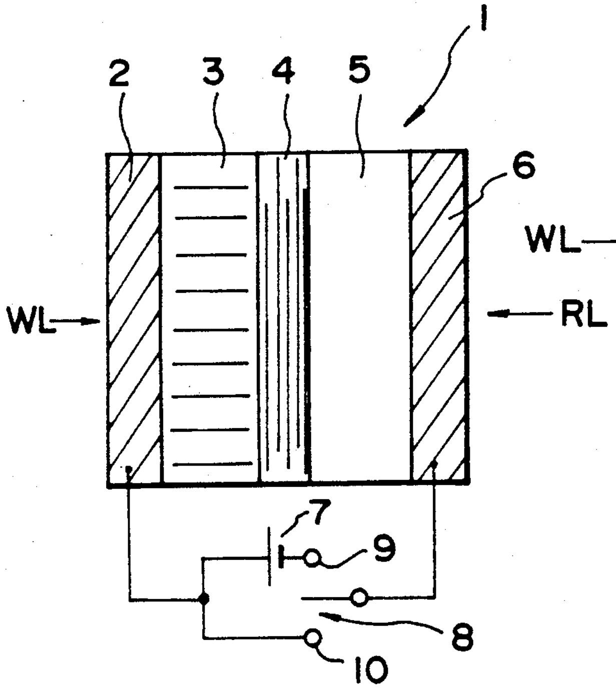
FIGS. 1 and 2 are cross sectional views showing the configuration of a PPC used in preferred embodiments according to the present invention.

The image information processing method and the apparatus thereof will be explained in detail, with reference to the accompanying drawings.

Throughout the drawings, like reference numerals and letters are used to designate like or equvalent elements for the sake of simplicity of explanation.

First, the configuration and the operation of the PPC used for the image information processing method according to the present invention will be explained with reference to FIGS. 1 to 3.

Figure 2:
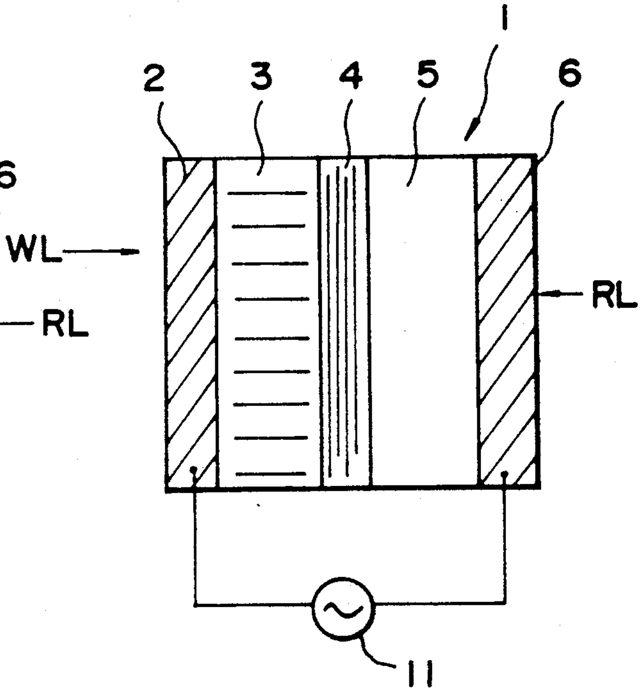

In FIGS. 1 and 2, the PPC 1 is composed of electrodes 2 and 6, a photoconductive layer (hereinafter abbreviated in a PCL.) member 3 which has sensitivity to an electro-magnetic radiation beam having a first specific wave length, a dielectric mirror 4 which reflects an electro-magnetic radiation beam having a second specific wave length different from the first wave length and a PML member 5 (made of a photo-modulation material such as lithium niobate or nematic liquid crystal) to vary an electro-magnetic radiation beam accordingly with the field intensity-distribution. WL is the electro-magnetic radiation beam having the first specific wave length for recording an image of electro-magnetic radiation beam as a charge image on the PPC 1. While, RL is the electro-magnetic radiation beam having the second specific wave length for reading out the charge image recorded on the PPC 1.

The electrode 2 is transparent to at least the electro-magnetic radiation beam having the first specific wave length. While, the electrode 6 is transparent to at least the electro-magnetic radiation beam having the second specific wave length.

The circuit composed of a power source 7 and a switch 8 is connected across the electrodes 2 and 6 in FIG. 1. By a switching control signal supplied to an input terminal (not shown), a movable contact of the switch 8 is switched to a fixed contact 9 side thereof to apply a voltage across the electrodes 2 and 6 to apply an electric field across the PCL member 3.

When the electro-magnetic radiation beam RL is incident to the PPC 1, the beam WL passes through the electrode 2 and reaches the PCL member 3. The electric resistance of the PCL member 3 thus varies accordingly with the intensity distribution of the beam WL. Therefore, a charge image having the intensity distribution corresponding to the beam WL is generated in the vicinity of the border of the PCL member 3 and the dielectric mirror 4.

Next, when the constantly intense electro-magnetic radiation beam RL is incident to the electrode 6, the beam RL in the visible region passes through the PML member 5, is then reflectd at the dielectric mirror 4 and again passes through the PML member 5 and emitted out from the electrode 6. The beam RL varies accordingly with the charge distribution of the charge image recorded in the vicinity of the border of the PCL member 3 and the dielectric mirror 4. Accordingly, the electric field corresponding to the charge distribution of the recorded charge image is applied to the PML member 5 provided in series to the PCL member 3 with the dielectric mirror 4.

The reflective index of the PML member 5 further varies accordingly with the electric field due to photoelectric effect and also varies accordingly with the charge image distribution.

Therefore, when the beam RL is incident to the electrode 6, the beam RL proceeds to the PML member 5 and the dielectric mirror 4, is then reflected at the mirror 4 to return to the electrode 6. Since, the reflective index of the PML member 5 varies accordingly with the electric field due to photoelectric effect, the beam RL carries the information corrsponding to the field intensity-distribution applied to the PML member 5 and is emitted from the electrode 6.

In the case of erasing the recorded charge image, the movable contact of the switch 8 is switched to a fixed contact 10 by supplying the swiching control signal to force the potentials of the electrodes 2 and 6 to be same level, then an electro-magnetic radiation beam having constant intensity distribution is incident to pass through the PCL member 3.

With regard to the PPC 1 shown in FIG. 1, the PPC 1 shown in FIG. 2 is provided with the PML member 5 which is alternatively operated. An alternating power source 11 is connected across the electrodes 2 and 6 to perform recording/reproduction oprations.

When the electro-magnetic radiation beam WL is incident to the PCL member 3, pairs of an electron and a hole are generated in the PCL member 3 accordingly with the intensity of the beam WL. The electrons and holes are reciprocally transferred in the PCL member 3 due to the alternating electric field applied across the PCL member 3 and the PML member 5 by the alternating power source 11. The impedance of the PCL member 3 is thus varied accordingly with the intensity of the beam WL.

The field intensity applied across the PML member 5 therefore varies accordingly with the intensity of the beam WL. Consequently, the beam RL incident to the PPC 1 is modulated accordingly with the field intensity applied across the PML member 5 when the beam RL passes therethrough, and then the modulated beam RL is emitted from the PCC 1.

There is no need to perform particular erasing operation, in the case of recording/reproduction with the alternating power source 11 connected across the electrodes 2 and 6.

Figure 3:
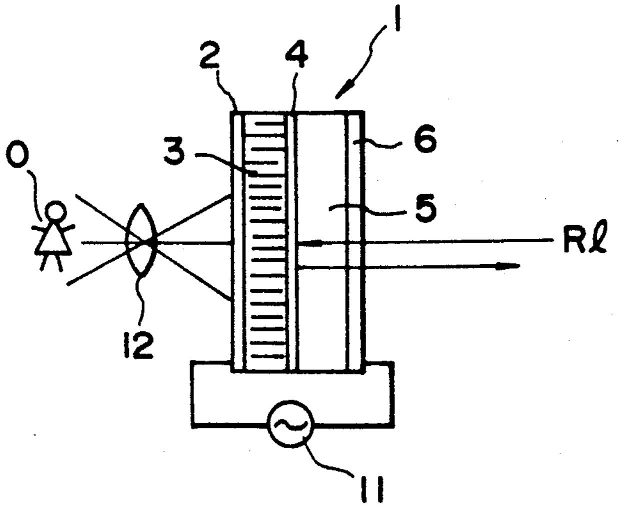
FIG. 3 is a side elevational view of an image pickup apparatus employing the PPC for explaining the operation of the PPC.

FIG. 3 is a block diagram of a image pickup apparatus employing the PPC 1 shown in FIGS. 1 and 2.

The image pickup apparatus in FIG. 3 has an imaging lens 12 and the alternating power source 11 connected across the electrodes 2 and 6 of the PPC 1. The electro-magnetic radiation beam having a first specific wave length is incident from an object O to the PPC 1 through the imaging lens 12.

Furthermore, an electro-magnetic radiation beam Rl having a second specific wave length, which is two-dimensionally deflected, is incident to the PPC 1 through a deflector, a collimator lens, a beam splitter and the like (not shown).

The recording/reading operations of the image pickup apparatus shown in FIG. 3 is the same as those described with reference to FIG. 2.

In the reading operation, the beam Rl once incident to the electrode 6 and emitted out therefrom is applied to an analyzer (not shown). The intensity of the beam Rl passing through the analyzer varies accordingly with the charge distribution of the charge image recorded in the vicinity of the border of the PCL member 3 and the dielectric mirror 4.

As is understood with reference to FIGS. 1 to 3, the charge image corresponding to the electro-magnetic radiation beam information is recorded on the PPC 1, is then read out as the electro-magnetic radiation beam information by means of the electro-magnetic radiation beam. This charge image recording operation may be applied to the recording on a charge image recording medium by means of the recording systems shown in FIGS. 4 to 6. Furthermore, reading of the charge image recorded on the recording medium may be performed by the reproducing system shown in FIGS. 7 to 9.

Figure 4:
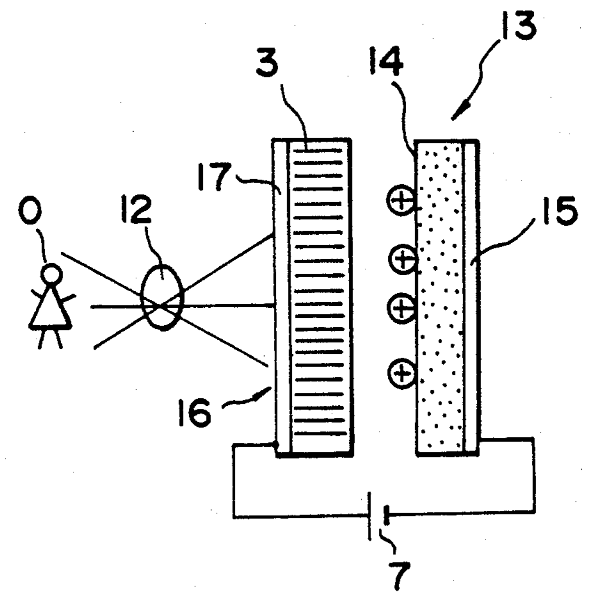
FIGS. 4, 5 and 6 are side elevational views showing the recording system to record an electro-magnetic radiation beam on a recording mediun as a charge latnet image.

In FIG. 4, there is provided a recording medium 13 composed of an insulation layer (hereinafter abbreviated in an IL) member 14 and an electrode 15, laminated to each other. Also provided is a recording head 16 composed of the PCL member 3 and an electrode 17, laminated to each other. The power source 7 is connected across the electrodes 15 and 17.

When an optical image of the object O is imaged on the PCL member 3 by the imaging lens 12 through the electrode 17, the electric resistance of the PCL member 3 varies accordingly with the optical image of the object O. A discharge is then generated across the gap of the PCL member 3 of the recording head 16 and the IL member 14 of the recording medium 13. A charge image of positive charges is thus recorded on the IL member 14.

Figure 5:
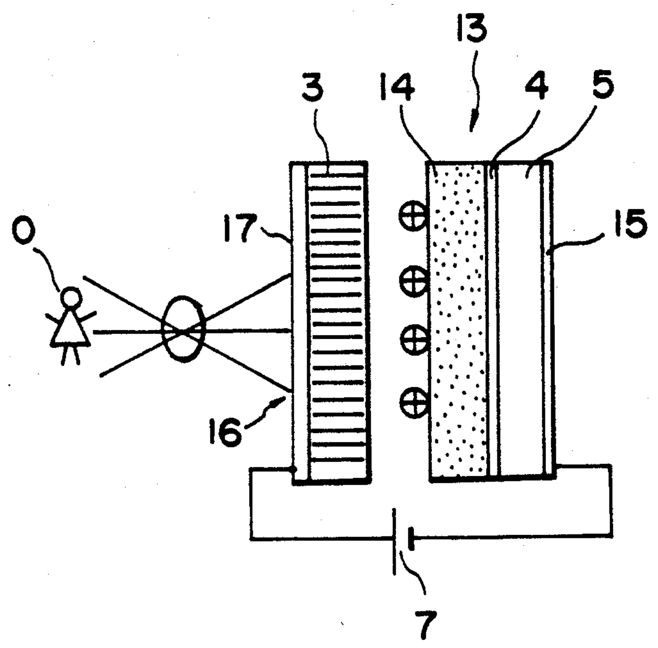

In FIG. 5, there is provided the recording medium 13 composed of the electrode 15, the dielectric mirror 4 and the IL member 14, laminated to each other in order. A charge image of positive charges is recorded on the IL member 14 in the same way as described with reference to FIG. 4.

Figure 6:
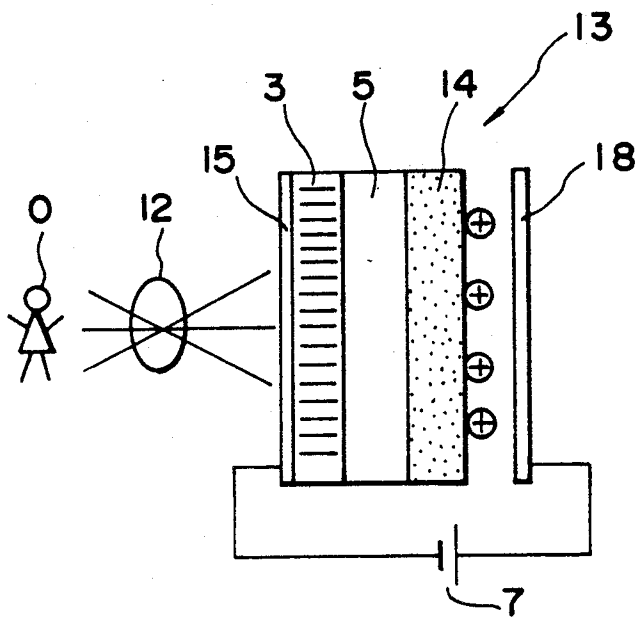

The recording system, shown in FIG. 6, is provided with the recording medium 13 which is composed of the electrode 15, the PCL member 3, the PML member 5 and the IL member 14, laminated to each other in order. The recording medium 13 is arranged such that an electro-magnetic radiation beam may passes therethrough. There is further provided an electrode 18.

In FIG. 6, when an optical image of the object O is imaged on the PCL member 3 by the imaging lens 12 through the electode 15 of the recording medium 13, the electric resistance of the PCL member 3 varies accordingly with the optical image of the object O. The discharge then occurs across the gap of the IL member 14 and the electrode 18. The charge image of the positive charges is therefore recorded on the IL member 14.

Figure 7:
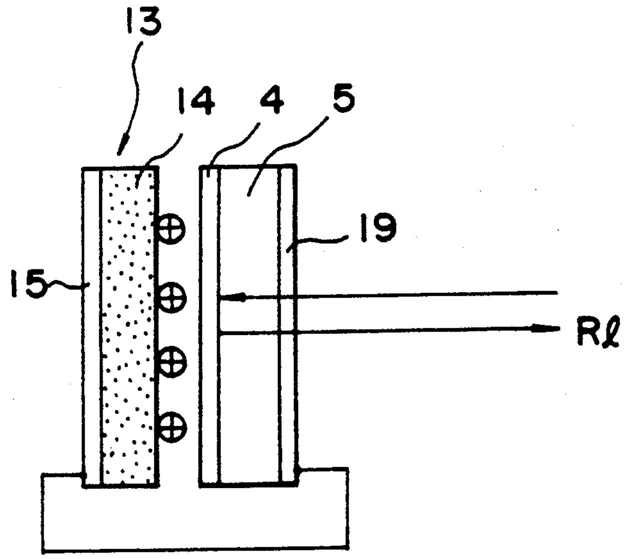
FIGS. 7, 8 and 9 are side elevational views showing reproducing systems (the reading systems) to read out the charge image by means of an electro-magnetic radiation beam.

The charge image recorded on the IL member 14 described with reference to FIG. 4 is read out by means of the reproducing system shown in FIG. 7. The reading member provided adjacent to the recording medium 13 in FIG. 7 is composed of the dielectric mirror 4, the PML member 5 and an electrode 19, laminated to each other in order.

A constantly intense electro-magnetic radiation beam Rl having a specific wave length is to be incident to the reading member from the electrode 19 thereof. The beam R1 may have large area or may be formed in a narrow beam which is specifically deflected.

When the electrode 19 of the reading member and the electrode 15 of the recording medium 13 are made in same potential and the beam R1 is incident to the electrode 19, the beam R1 passes the PML member 5 and is reflected at the dielectric mirror 4, and then again passes the PML member 5 to be emitted out from the electrode 19. The beam R1 varies accordingly with the charge distribution of the charge image recorded on the IL member 14 of the recording medium 13.

The beam R1 thus emitted out from the electrode 19 varies by means of the PML member 5 to which the electric field is applied from the charge image recorded on the IL member 14, and is emitted out from the electrode 19 as the beam R1 carries the information corresponding to the field intensity-distribution applied to the PML member 5.

Accordingly, when the beam R1 emitted out from the electrode 19 is incident to an analyzer (not shown), the beam R1 which passes the analyzer is then an electromagnetic radition beam whose intensity varies accordingly with the charge distribution of the charge image recorded on the IL member 14 of the recording medium 13.

Figure 8:
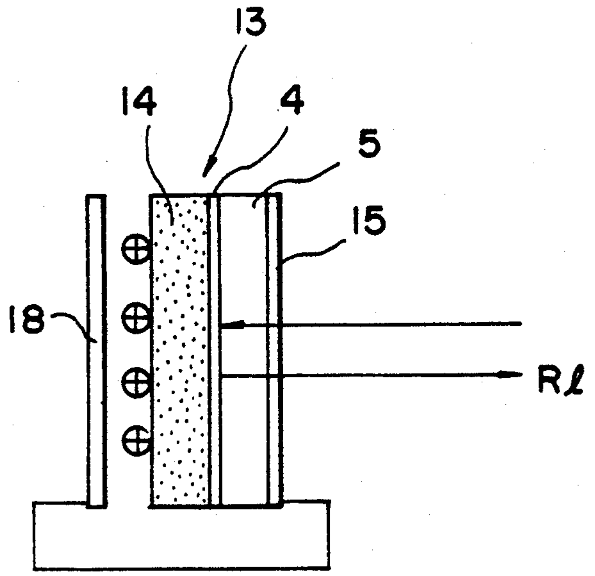

Next, the charge image recorded on the IL member 14 of the recording medium 13 by the recording system shown in FIG. 5 is read out as an electro-magnetic radiation beam information by the reproducing system shown in FIG. 8.

The recording medium 13 shown in FIG. 8 is composed of the IL member 14, the dielectric mirror 4, the PML member 5 and the electrode 15, laminated to each other in order.

When, the constantly intense electro-magnetic radiation beam R1 having a specific wave strength is incident to the electrode 15, the beam R1 passes the PML member 5 and is reflected at the dielectric mirror 4, and then again passes the PML member 5 to be emitted out from the electrode 15. The beam R1 varies accordingly with the charge distribution of the charge image recorded on the IL member 14.

The beam R1 thus emitted out from the electrode 15 varies by means of the PML member 5 to which the electric field is applied from the charge image recorded on the IL member 14 and carries the information corresponding to the field intensity-distribution applied to the PML member 5.

Accordingly, when, the beam R1 thus emitted out from electrode 15 is supplied to an analyzer (not shown), the intensity of the beam R1 passing the analyzer varies accordingly with the charge distribution of the charge image recorded on the IL member 14.

Figure 9:
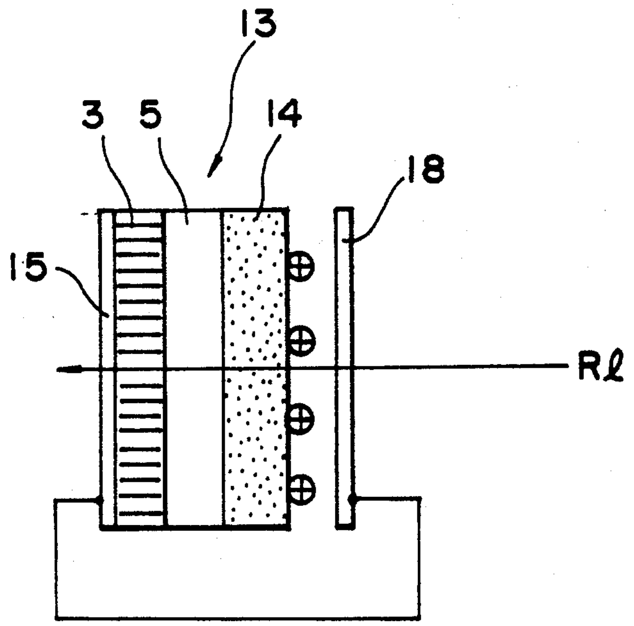

The charge image recorded on the IL member 14 of the recording medium 13 by the recording system shown in FIG. 6 is read out as the electro-magnetic radiation information by means of the reproducing system shown in FIG. 9.

The recording medium 13 shown in FIG. 9 is composed of the IL member 14, the PML member 5, the PCL member 3 and the electrode 15, laminated to each other in order and is arranged such that an electro-magnetic radiation beam can passes therethrough. There is further provided an electrode 18.

When the electrode 18 and the electrode 15 of the recording medium 13 are made to the same potential and a constantly intense electro-magnetic radiation beam R1, having a specific wave strength is incident to the IL member 14, the beam R1 passes the IL member 14, the PML member 5, the PCL member 3 and the electrode 15 in order, then is emitted out from the electrode 15. The beam R1 varies accordingly with the charge distribution of the charge image recorded on the IL member 14.

The beam R1 thus emitted out from the electrode 15 varies by means of the PML member 5 to which the electric field is applied from the charge image recorded on the IL member 14, the beam carries the information corresponding to the field intensity-distribution applied to the PML member 5.

Accordingly, when the beam R1 thus emitted out from the electrode 15 is supplied to an analyzer (not shown), the intensity of the beam R1 thus passing the analyzer varies accordingly with the charge distribution of the charge image recorded on the IL member 14.

As is understood with refernce to FIGS. 1 to 9, the charge image with extremely high resolution recorded on the PPC 1 or that recorded on the recoding medium 13 can be read out as an electro-magnetic radiation beam carrying the image information with extremely high resolution by means of an electro-magnetic radiation beam. Such information carrying the image information with extremely high resulution should be converted into specific image information by various image processing such as matrix processing, non-linear processing, contouring processing, gain control (amplification and attenuation) and the like.

However, such image processing of the electro-magnetic radiation beam carrying the image information with extremely high resolution to convert the beam into electric signals having extremely wide frequency band requries a complex and large image processing section which costs very much.

The present invention is therefore to perform image processing to the electro-magnetic radiation beam, as it is, carrying the image information with extremely high resolution.

Figure 10:
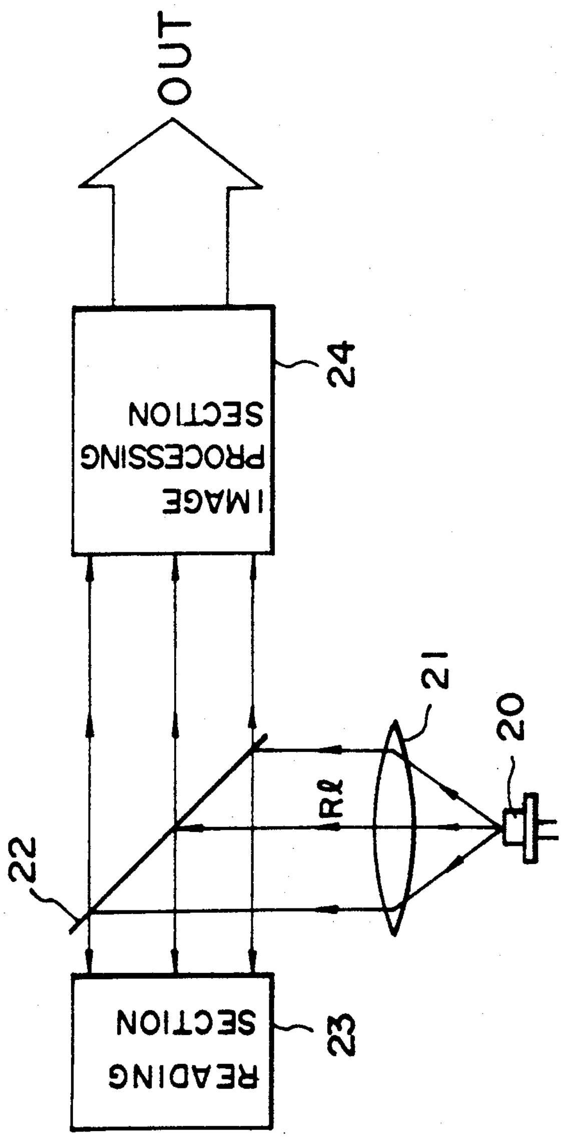
FIG. 10 is a block diagram of a preferred embodiment of an image information processing system provided with an image processing section to process an image by way of an image information processing method according to the present invention.

FIG. 10 shows an image processing system provided with an image processing section to perform such image processing according to the present invention.

In FIG. 10, the image processing system is composed of a generator 20 (such as a laser source) for generating the electro-magnetic radiation beam R1, a lens 21, a beam splitter 22, a reading section 23 and an image processing section 24.

The image processing section 24 is provided with image processing functions such as matrix processing, non-linear processing, contour enhancement processing, gain control (amplification and attenuation) and the like. The reading section 23 is arranged to read out the electro-magnetic radiation beam carrying the image information with extremely high resolution as described with refernce to FIGS. 1 to 9.

The electro-magnetic radiation beam R1 emitted out from the generator 20 is made parallel by the lens 21 to be supplied to the reading member 23 through the beam splitter 22.

The reading member 23 generates an electro-magnetic radiation beam carrying the image information with extremely high resolution by means of the beam R1. The beam thus generated from the reading member 23 is supplied to the image processing section 24 in which the beam is processed with the specific image processing such as matrix processing, non-linear processing, contour enhancement processing, gain control (amplification and attenuation) and the like. Then the beam thus processed is generated from the image processing section 24.

Figure 12:
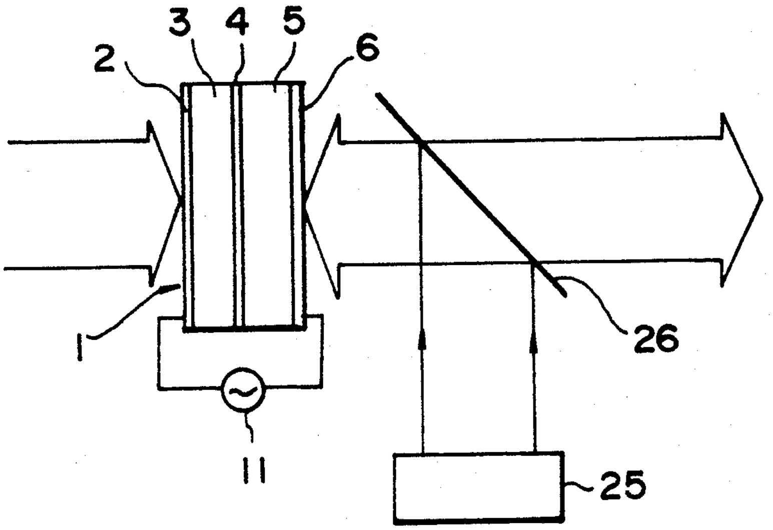
FIGS. 12, 13, 15, 16 and 19 are block diagrams of image processing sections to process an image, diferrent from each other.

FIG. 12 shows a block diagram of an intensity adjusting system employing the PPC 1 which has the configuration described with reference to FIG. 1.

An electro-magnetic radiation beam whose intensity is to be adjusted is incident to the electrode 2 of the PPC 1. Moreover, an electro-magnetic radiation beam for reading operation is incident to the electrode 6 of the PPC 1 from an generator 25 through a beam splitter 26.

The generator 25 adjusts the intensity of the beam to be incident to the electrode 6 to adjust the original intensity of the beam incident to the electrode 2.

Figure 13:
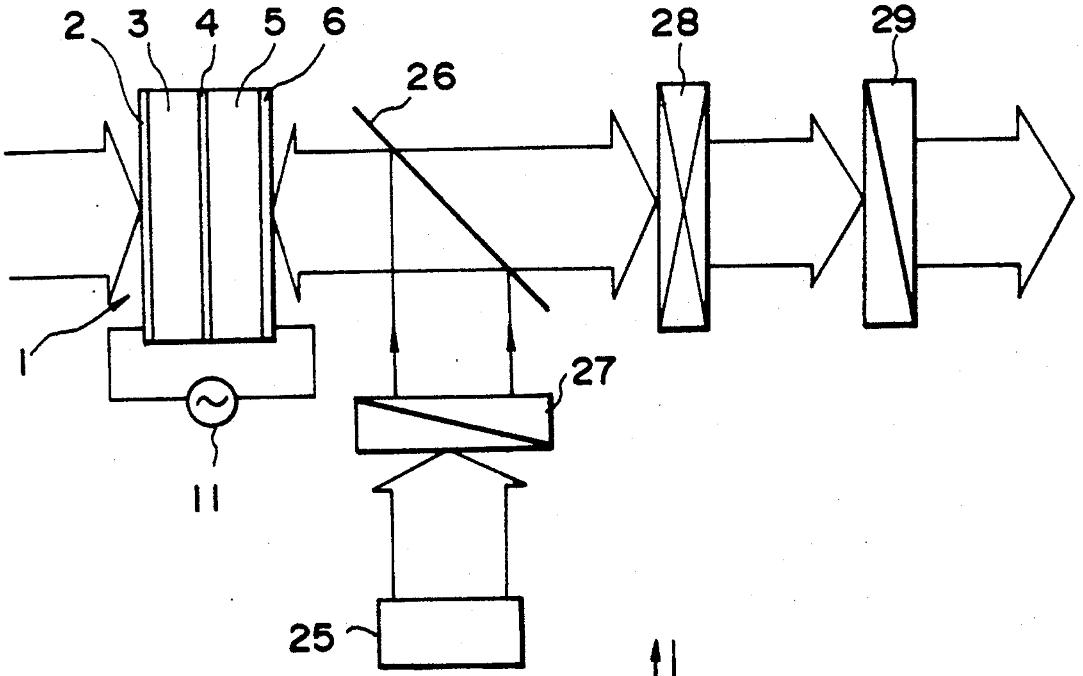

Next, FIG. 13 is a block diagram of a polarity inversion system for inverting the polarity of the image, employing the PPC 1 which has the configuration described with reference to FIGS. 1 and 2.

An electro-magnetic radiation beam whose image polarity is to be inverted is incident to the electrode 2 of the PPC 1. While, an electro-magnetic radiation beam for reading operation is incident to the electrode 6 of the PPC 1 from the generator 25 through a polarizer 27 and the beam splitter 26.

The generator 25 adjusts the intensity of the beam for reading opration.

The beam for reading opration incident to the electrode 6 is modulated due to the electric field generated from the charge image recorded on the PPC 1, formed by means of the beam carrying the image information whose image polarity is to be inverted, and is supplied to a wave-plate 28 through the beam splitter 26.

Figure 14:
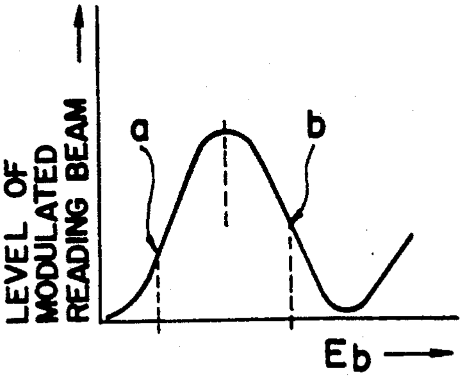
FIGS. 14, 17, 18 and 20 are the examples of characteristics and waveforms for explaining the image processing operation.

FIG. 14 is a photoelectric characteristic curve of the system including the PPC 1 and the analyzer 29, in which the axis of ordinates denotes the reading beam modulated accordingly with the intensity variation of the beam incident to the electrode 2 of the PPC 1 and carrying the image information whose image polarity is to be inverted, while the axis of abscissa denotes a voltage Eb applied across the electrodes 2 and 6 of the PPC 1.

As is obvious from the curve shown in FIG. 14, when the operating range of the PML member 5 is set to the point a by varying the peak value of the voltage applied by the alternating power source 11, the polarity of the generated beam is the same as that of the beam carrying the image information. While, setting the operating point to the point b causes the polarities inverted. This results in polarity inversion of image between the two images emitted to and out from the PPC 1 respectively. Setting the operating point to the point b is done by the adjustment of the wave-plate 28 or a reorientation of the analyzer 29.

Figure 15:
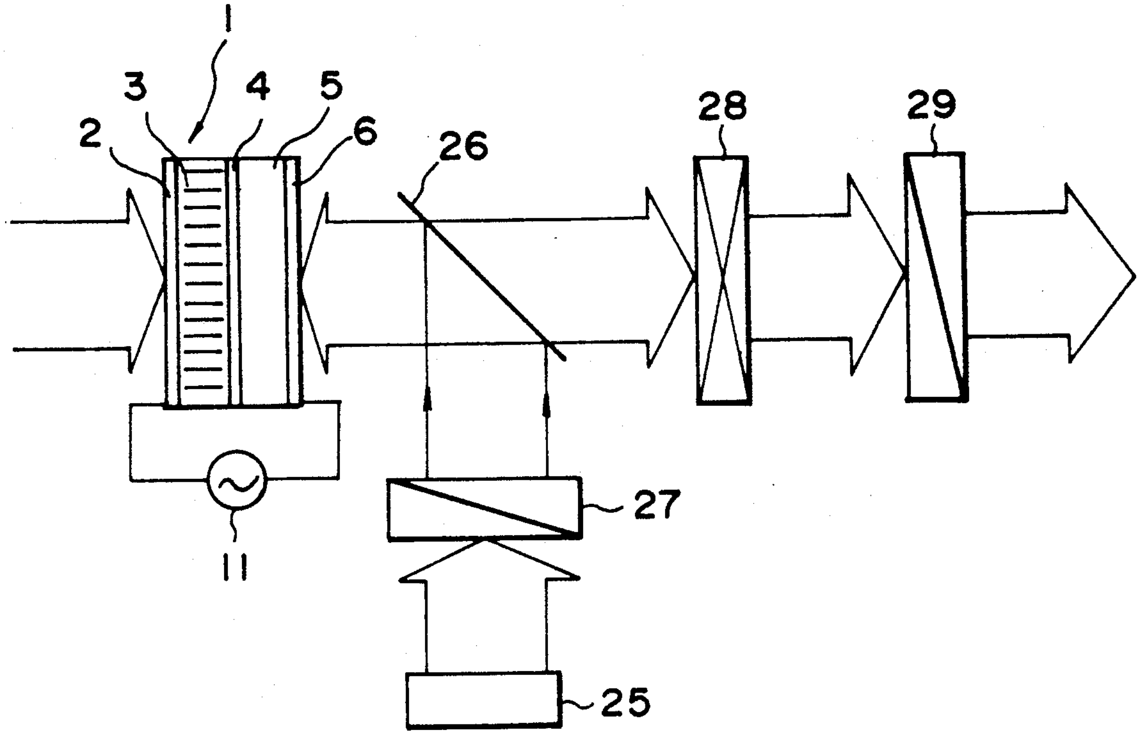
Figure 16:
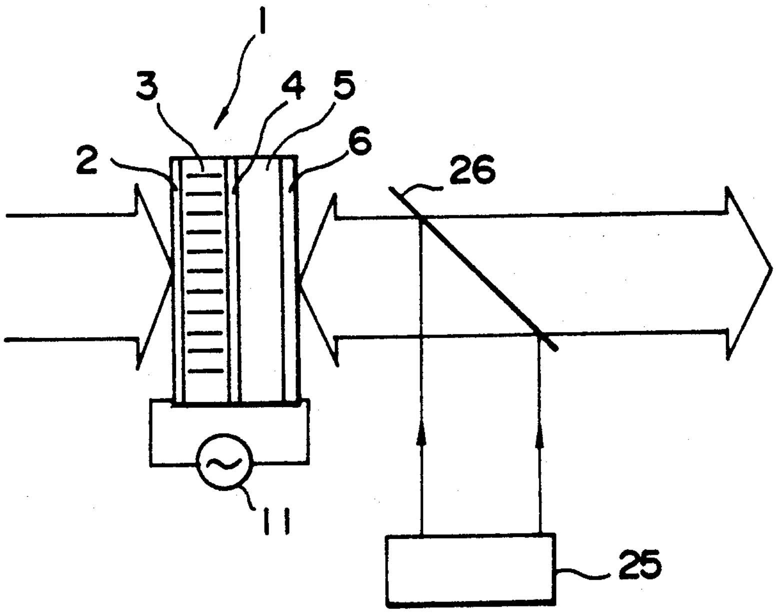
Figure 17:
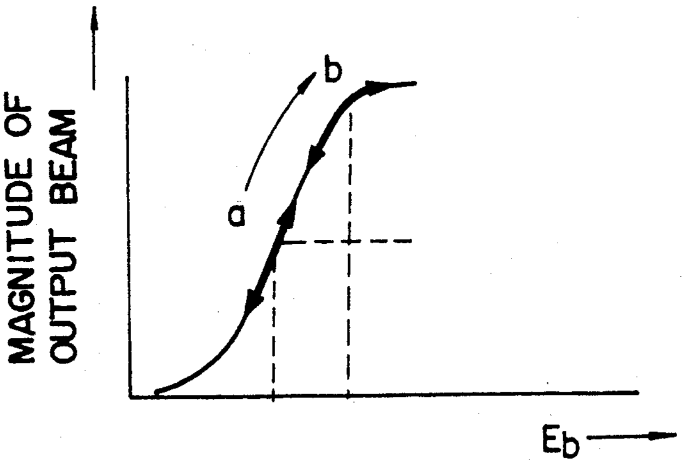
Figure 18:
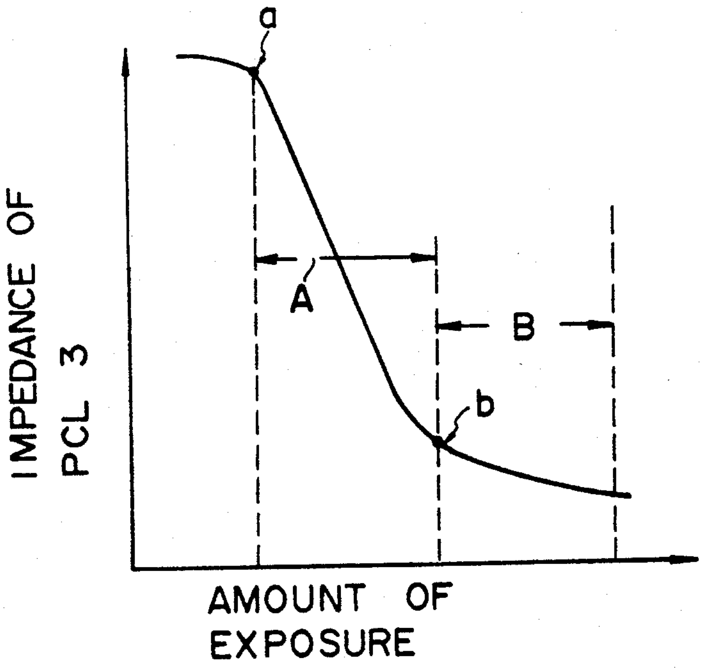

Next, FIGS. 15 and 16 show the block diagrams of different arrangements of a non-linear processing (gamma correction, etc.) apparatus including the PPC 1. FIG. 17 is a characteristic curve for explaining the non-linear processing apparatus shown in FIG. 15. While, FIG. 18 is a characteristic curve for explaining the non-linear processing apparatus shown in FIG. 16.

The PPC 1 in the non-linear processing apparatuses shown in FIGS. 15 and 16 has the same configutration as that shown in FIGS. 1 and 2.

First in FIG. 15, an electro-magnetic radiation beam carrying the image information which is to be nonlinearly processed is incident to the electrode 2 of the PPC 1. While, an electro-magnetic radiation beam for reading operation generated from the generator 25 is incident to the electrode 6 of the PPC 1 through the the polarizer 27 and the beam splitter 26.

According to the process explained previously with FIG. 1, the beam incident to the electrode 6 is modulated correspondingly with the charge image recorded on the PPC 1 by means of the beam incident to the electrode 2 and is emitted out from the electrode 6. The beam thus modulated passes the beam splitter 26, and is supplied to the wave-plate 28.

FIG. 17 is a photoelectric characteristic curve of the PML 5 of the PPC 1 in which the axis of ordinates denotes a magnitude of the mudulated beam which is outputted in responce to the intensity variation of the beam incident to the electrode 2 and carrying the image information whose characteristics are to be modified for such as gamma-correction, while the axis of abscissa denotes a voltage Eb applied to the PML member 5 of the PCC 1.

As is obvious from FIG. 17, when the operating range of the PML 5 is reset from the range a to b by varying the peak value of the voltage applied by the alternating power source 11, the PPC 1 linearly operated in the linear region a of the curve is changed to be nonlinearly operated in the non-linear region b.

Next in the nonlinear processing apparatus shown in FIG. 16, an electro-magnetic radiation beam carrying the image information which is to be nonlinearly processed is incident to the electrode 2 of the PPC 1. While, an electro-magnetic radiation beam for reading operation is generated from the generator 25 and is incident to the electrode 6.

The beam incident to the electrode 6 is modulated due to the charge image recorded on the PPC 1 by means of the beam incident to the electrode 2 and is emitted out from the electrode 6. The beam thus modulated passes the beam splitter 26 and is emitted out therefrom.

FIG. 18 is a characteristic curve of the PCL 3 of the PPC 1 showing the relationship of the amount of exposure to the incident light and impedance of the PCL 3. It is obvious from FIG. 18, that if the intensity (level) of the beam carrying the image information and incident to the electrode 2 is adjusted by some known means (not shown in FIG. 16), the operating range of the PCL 3 can be shifted from the range a to b, i.e. from the linear range A to the nonlinear range B. This causes the input-/output characteristic of the PPC 1 with respect to the input and output beams becoming nonlinear.

In the case of operating the PCL 3 in its non-linear range, such non-linear characteristic is selected to achieve the desired overall linear or non-linear characteristic of the total system.

Figure 19:
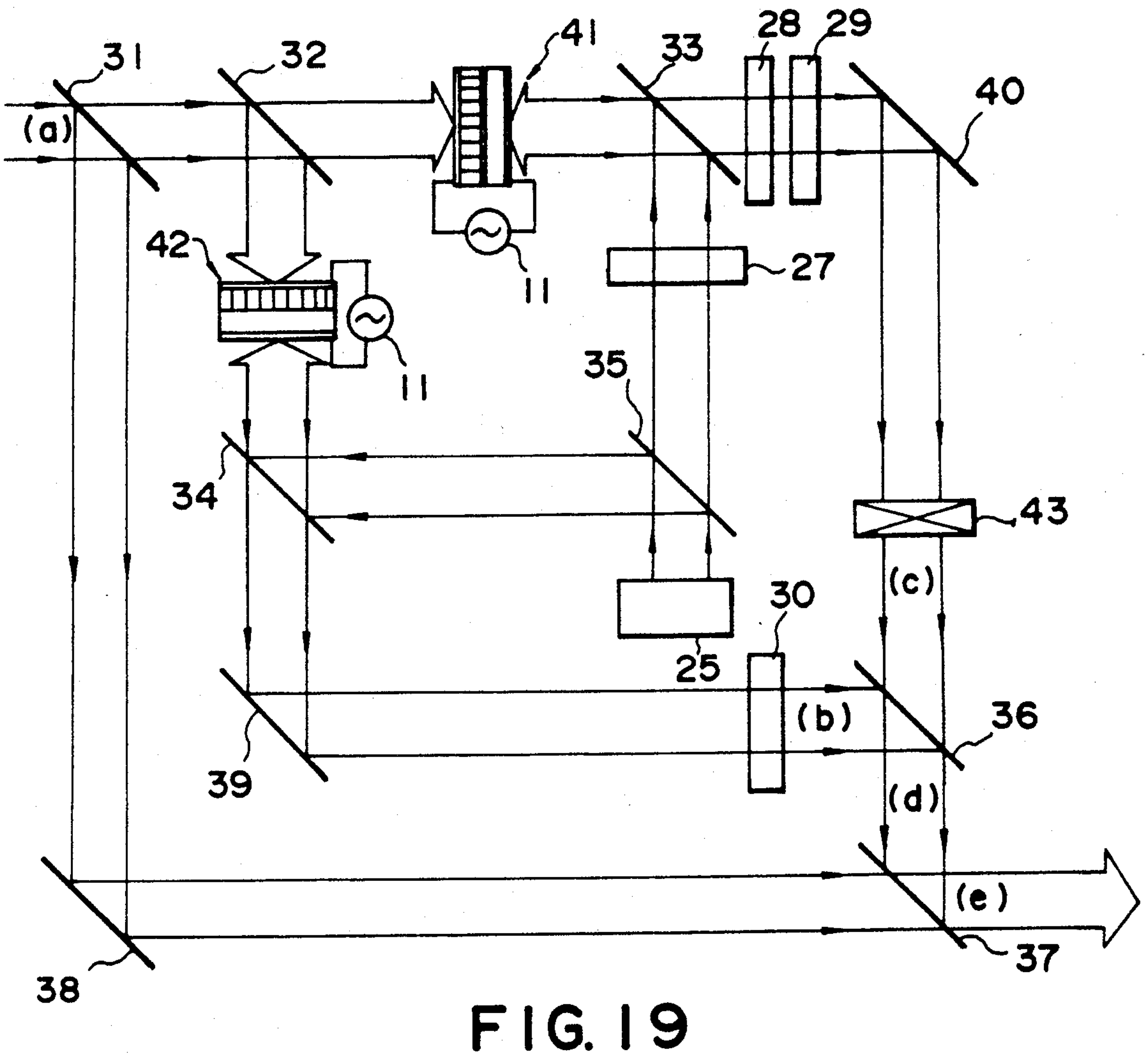

FIG. 19 shows a block diagram of a contour enhancement apparatus including the PPC 1. The PPCs 41 and 42 have the configulation shown in FIGS. 1 and 2, the structual components of the PPCs 41 and 42 are not shown in this figure.

The contour enhancement apparatus shown in FIG. 19 is provided with beam splitters 31 to 37, total reflection mirrors 38, 39 and 40, the generator 25 for generating the electro-magnetic radiation beam for reading the information from the PCCs 41 and 42, the wave-plate 28 for adjusting optical bias (input intensity level) of the PPCs 41 and 42, the polarizer 27, analyzers 29 and 30 and a lowpass filter 43.

The electro-magnetic radiation beam carrying the information to be processed and depicted with (a) in FIG. 19 is incident to the beam splitter 31 and is splitted by the beam splitter 32 into one beam incident to the PPC 41, and other beam incident to the PPC 42.

The beam reflected at the beam splitter 31 is reflected at the total reflection mirror 38, then passes the beam splitter 37 to be emitted out therefrom.

The part of the beam generated from the generator 25 is incident to the PPC 41 through the beam splitter 35, the polarizer 27 and the beam splitter 33 in order. While, the other part of the beam generated from the generator 25 is incident to the PPC 42 through the beam splitters 35 and 34 in order.

The beam (b) returned from the PPC 42 and carrying the read out information is supplied to the beam splitter 36 through the beam splitter 34, the total reflection mirror 39 and the analyzer 30 in order. The beam (b) thus returned from the PPC 42 have the same polarity (of the waveform representing intensity variation of the beam) as that of the beam (a) incident to the PPC 42.

On the other hand, the beam returned from the PPC 41 and carrying the read out information is supplied to the beam splitter 36 through the beam splitters 33, the wave-plate 28, the analyzer 29, the total reflection mirror 40 and the optical lowpass filter 43 in order. The beam (c) thus returned have a waveform of the opposite polarity and slow rise and fall in contrast to that of the beam (a) incident to the PPC 41. The latter is caused by the optical lowpass filter 43 which reduces the high space frequency components of the image. And, the polarity inversion may be done by the system explained previously with FIG. 13.

Figure 20:
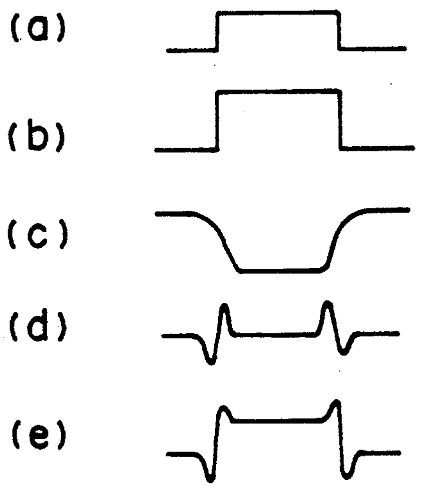

The beam emitted out from the beam splitter 36 therefore have the waveform depicted with (d) in FIG. 20 which is the result of the superposition of the waveforms depicted with (b) and (c) in FIG. 20 and supplied to the beam splitter 37.

Since, the beam depicted with (a) in FIG. 20 is supplied to the beam splitter 37 after reflected at the beam splitter 31 and the total reflection mirror 38, the beam emitted out from the beam splitter 37 has the waveform depicted with (e) in FIG. 20 which is the result of the superposition of the waveforms depicted with (a) and (d) in FIG. 20. This results in the contour of the waveform (a) being enhanced to be the waveform (e).

Figure 11:
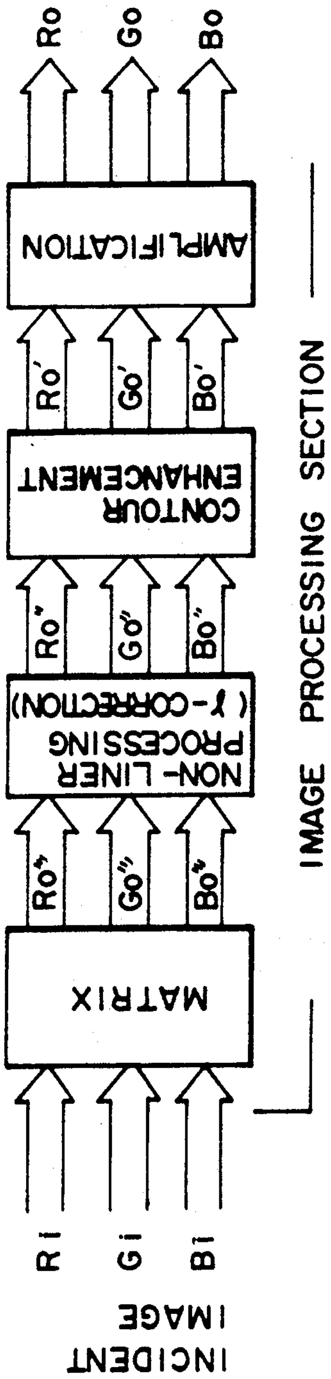
FIG. 11 is block diagram of image processing section showing various image processing functions in respective block.

The degree of the contour emphasis depends on the intensity of the beam generated from the generator 25. Related to these processings, the matrix circuit shown in FIG. 11 is realized by way of superpositions, substractions, polarity inversions and level controls of the incident beams of image.

Next, an image information processing apparatus using an image pickup apparatus which employs the image information processing method according to the present invention will be explained with reference to FIGS. 21 to 34.

Figure 21:
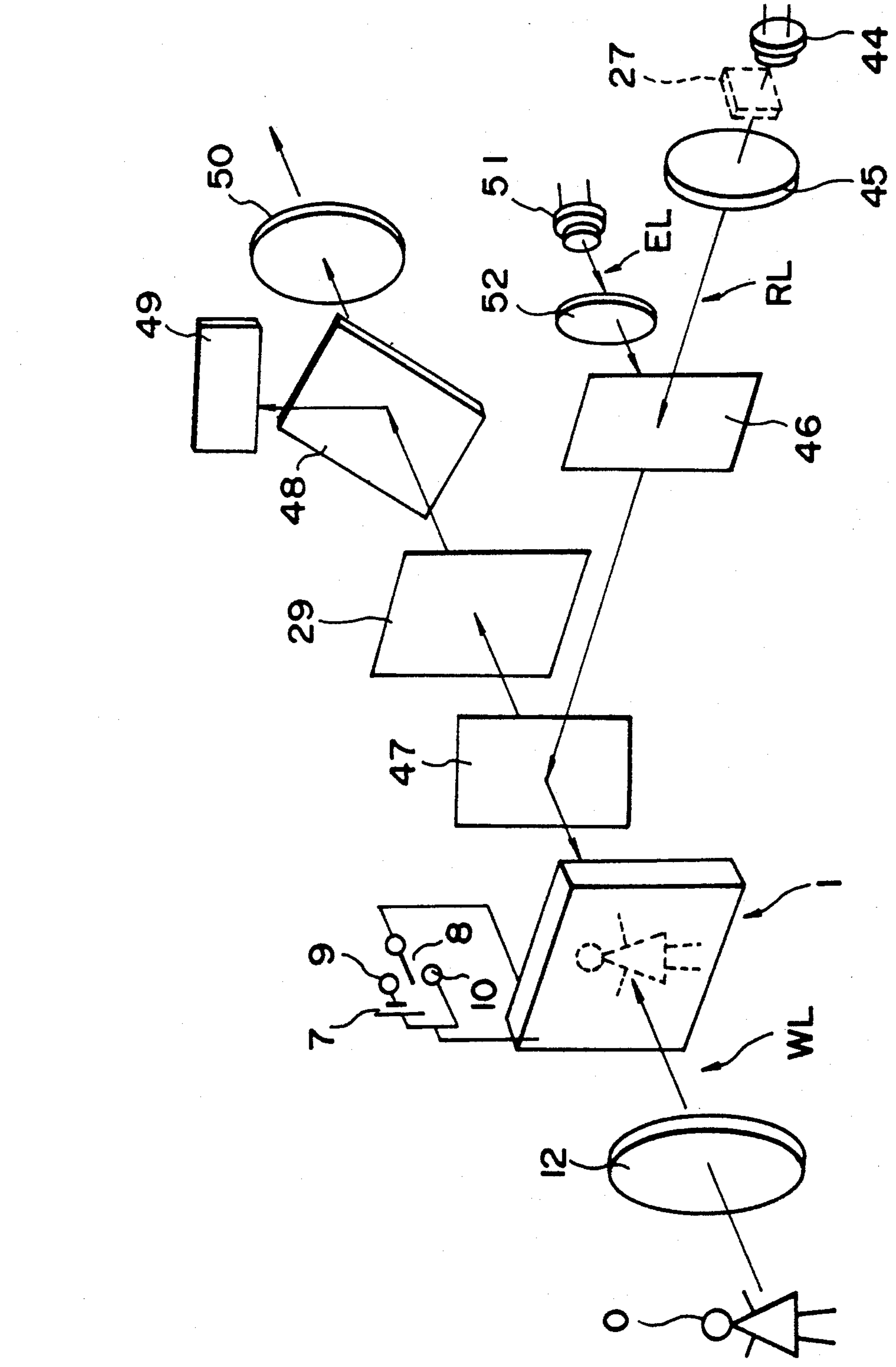
FIGS. 21 to 34 are block diagrams of image pickup apparatus employed to the image information processing method according to the present invention.

The image pickup apparatus shown in FIG. 21 is provided with the PPC 1 which has the configuration the same as that shown in FIG. 1 and is operated also in the way same as described with reference to FIG. 1. When an constantly intense electro-magnrtic radiation beam RL for reading opration generated from a generator 44 is incident to the electrode 6 of the PPC 1, the charge image recorded in the vicinity of the border of the PML member 5 and the dielectric mirror 4 is read out as already described.

The beam RL from the generator 44 is supplied to a lens 45 through the polarizer 27. The beam emitted out from the lens 45 has a cross section capable of simultaneous reading of all information in the reading region of the PPC 1 to which the beam RL is incident through beam splitters 46 and 47. The beam RL thus incident to the PPC 1 passes to PML member 5 and is reflected at the dielectric mirror 4, and then again passes the PML member 5 to be emitted out from the electrode 6.

The beam RL emitted out from the electrode 6 is varied accordingly with the charge distribution of the charge image recorded in the vicinity of the border of the PML member 5 and the dielectric mirror 4.

The image processing apparatus shown in FIG. 21 has an electro-magnetic radiation beam generator 51 for erasing operation. In the case of erasing the charge image recorded on the PPC 1, the movable contact of the switch 8 is switched to the fixed contact 10 side, then an electro-magnetic radiation beam EL for erasing operation from the generator 51 is incident to the PPC 1 through the lens 52, the beam splitters 46 and 47 in order.

Figure 22:
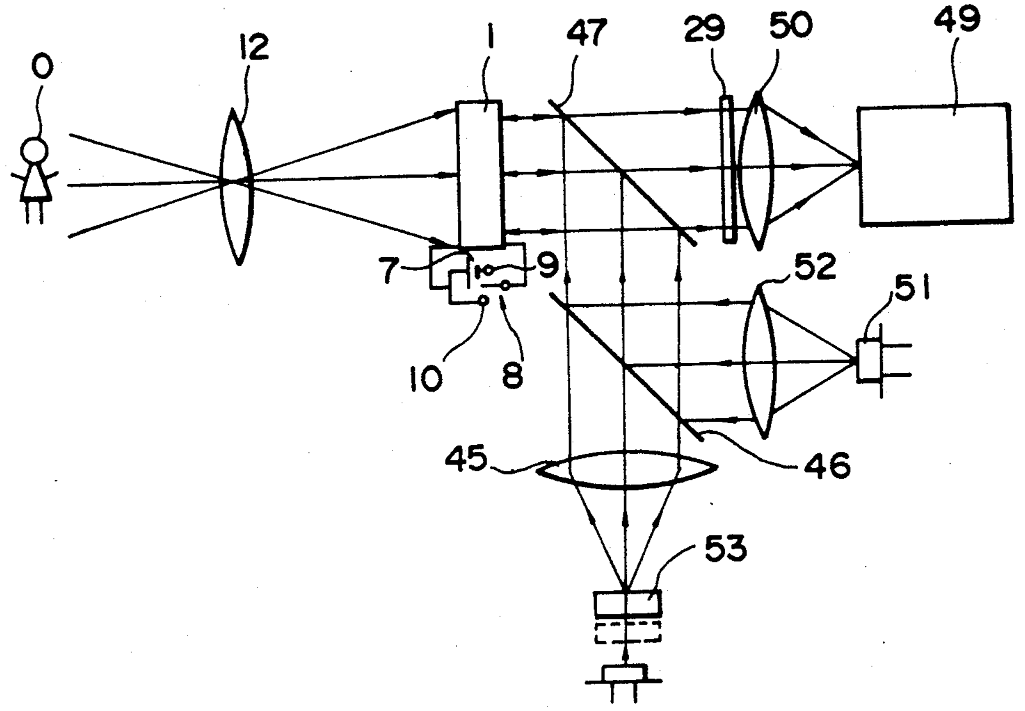
Figure 23:
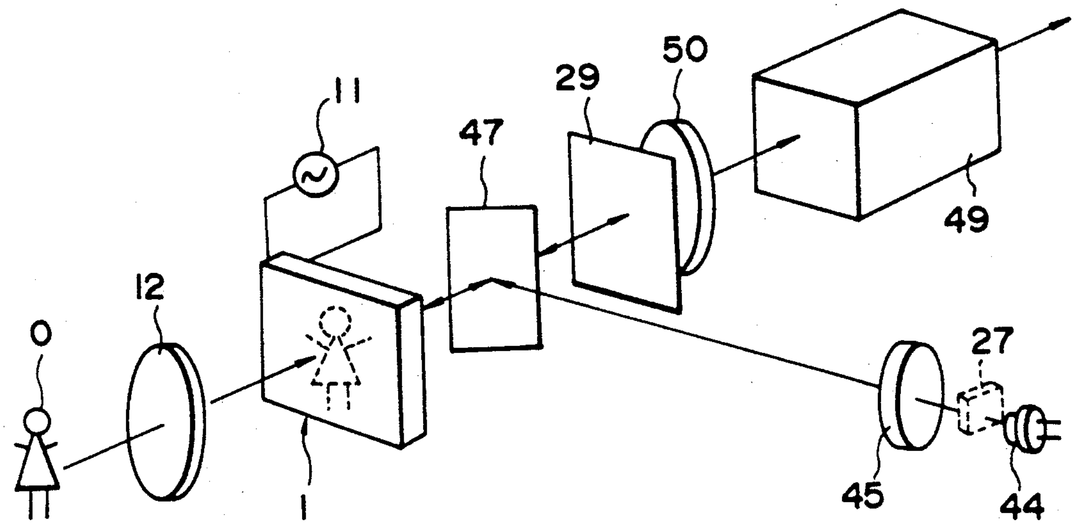
Figure 24:
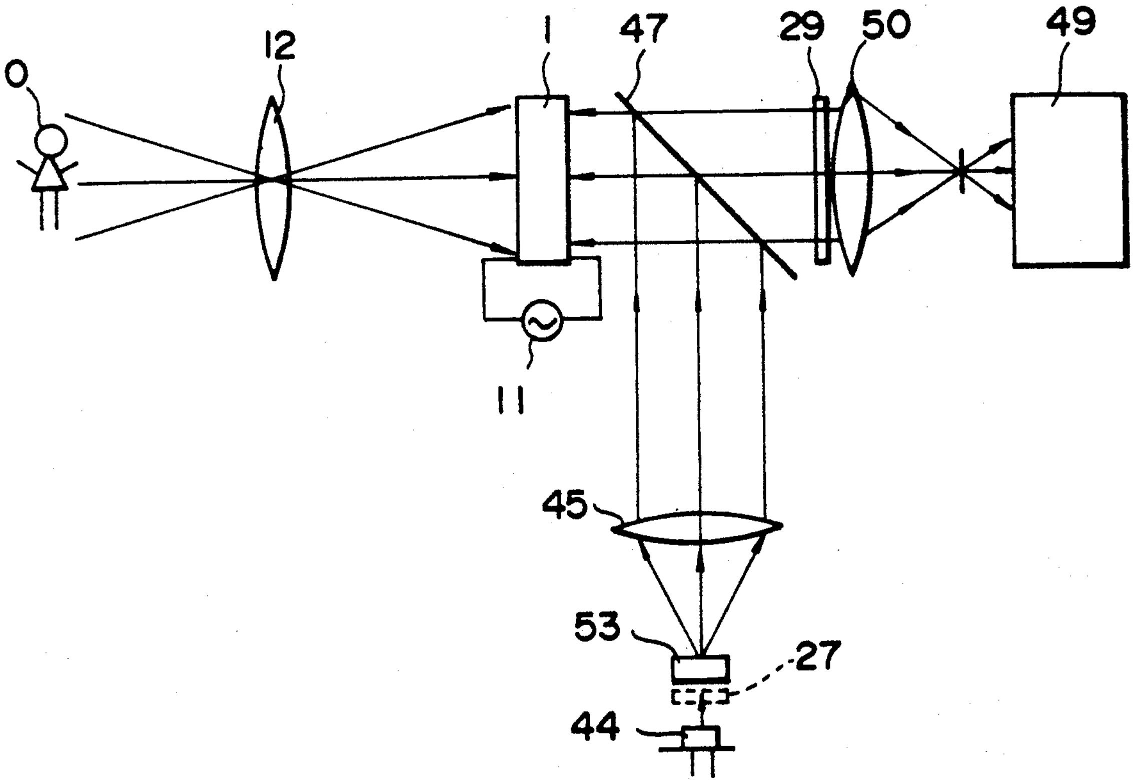

Next in FIG. 22, a narrow and constantly intense electro-magnetic radiation beam is vertically and transversely deflected by a deflector 53 to scan the entire reading region of the PPC 1. The PPC 1 in FIG. 22 has the same configuration as that shown in FIG. 1 and is operated as described with reference to FIG. 1.

A constantly intense electro-magnetic radiation beam RL from the generator 44 is incident to the deflector 53 through the polarizer 27. The deflector 53 deflects the beam RL which is supplied to the lens 45. The beam RL emitted out from the lens 45 is supplied to the PPC 1 through the beam splitters 46 and 47 to vertically and transversely scan the entire reading region of the PPC 1.

In the PPC 1, the beam RL passes the PML member 5 (not shown) and deflected at the dielectric mirror 4 (not shown), and then again passes the PML member 5 to be emitted out from the electrode 6 (not shown). The beam RL emitted out from the electrode 6 is varied accordingly with the charge distribution of the charge image recorded in the vicinity of the border of the PML member 5 and the dielectric mirror 4.

Accordingly, when the beam RL emitted out from the electrode 6 passes the beam splitter 47 and is supplied to the analyzer 29, the intensity of the beam RL emitted out from the analyzer 29 is varied accordingly with the charge distribution of the charge image recorded in the vicinity of the border of the PML member 5 and the dielectric mirror 4.

The beam RL emitted out from the analyzer 29 is supplied to the image processing section 49 through the lens 50. The image processing section 49 has the functions such as matrix processing, non-linear processing, conture enhancement processing, gain control (amplification and attnuation) and the like as shown in FIG. 11.

The imaging apparatus shown in FIG. 22 has simple configuration to process the electro-magnetic radiation beam carrying the image information having extremely high resolution without converting the beam into electric signals, like shown in FIG. 21.

The image processing apparatus shown in FIGS. 21 and 22 are provided with a circuit composed of the power source 7 and the switch 8 across the electrodes 2 and 6 of the PPC 1. While in FIGS. 23 and 24, there is provided an alternating power source 11 across the electrode 2 and 6 (not shown). The imaging apparatus shown in FIGS. 23 and 24 also have simple configuration to process the electro-magnetic radiation beam carrying the image information having extremely high resolution without converting the beam into electric signals.

Next in FIGS. 25 to 34, the image pickup apparatus perform image processing to the electro-magnetic radiation beam emitted out from the imaging section as it is. The imaging section can generate an electro-magnetic radiation beam carrying the image information having extra high resolution. Such as shown in FIGS. 1, 2, 7 to 9 and 21 to 24 may be applicable to the imaging section.

The image pickup apparatus shown in FIGS. 25 to 27 and 33 are provided with an imaging section to generate an electro-magnetic radiation beam carrying time series informations which is supplied to an optical processing system (an image processing section). While, the image pickup apparatus shown in FIGS. 28 to 32 are provided with an imaging section to generate an electro-magnetic radiation beam carrying circular informations which is supplied to an optical processing system (an image processing section).

The image pickup apparatus shown in FIGS. 25, 26, 28 and 32 are provided with an optical processing system (an image processing section) to generate an electro-magnetic radiation beam carrying time series informations. Moreover, the image pickup apparatus shown in FIGS. 27, 29 to 31, 33 and 34 are provided with an optical processing system (an image processing section) to generate an electro-magnetic radiation beam carrying circular informations.

Figure 25:
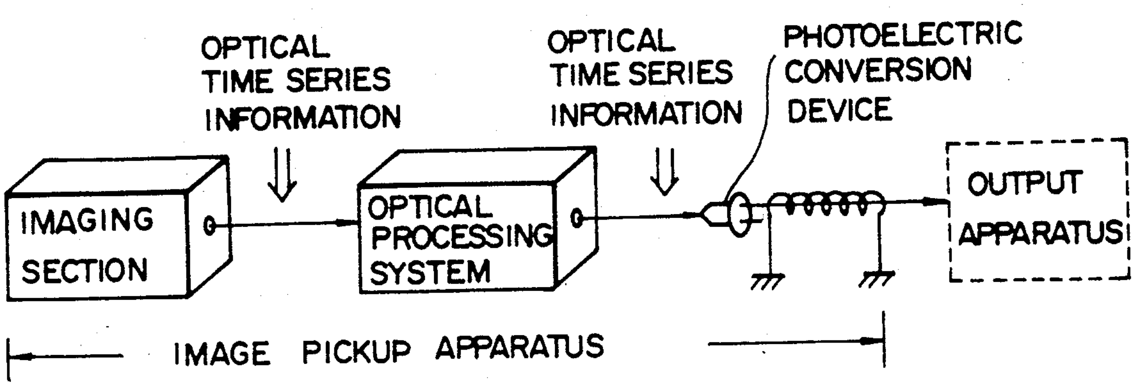
Figure 28:
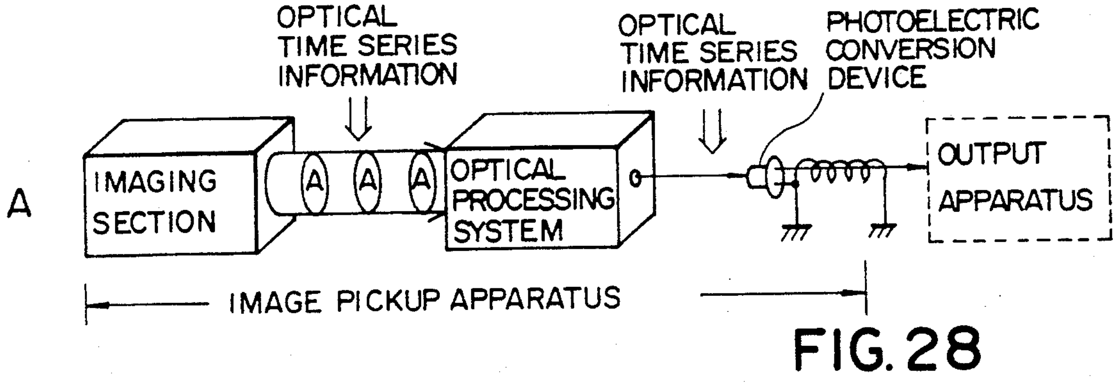

The image pickup apparatus shown in FIGS. 25 and 28 are further provided with a photoelectric converter to photoelectrically convert the beam carrying time series information generated from the optical processing system (an image processing section) into electric signals which are supplied to an output apparatus.

Figure 26:
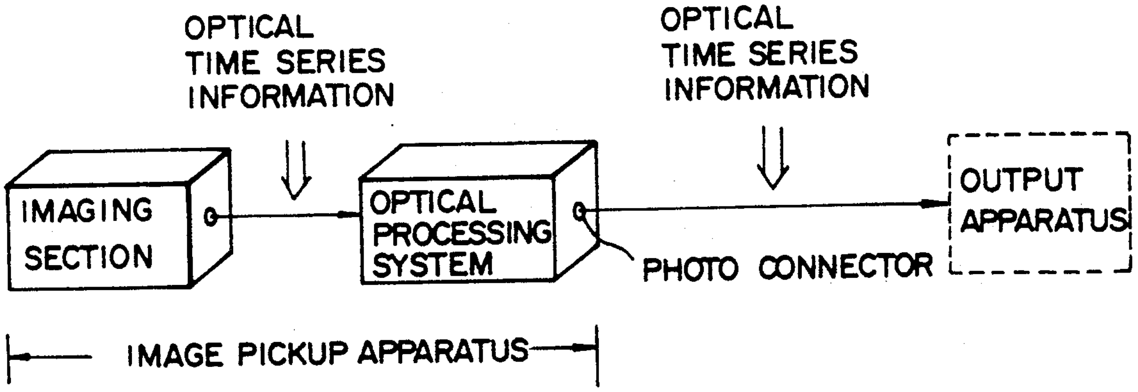
Figure 27:
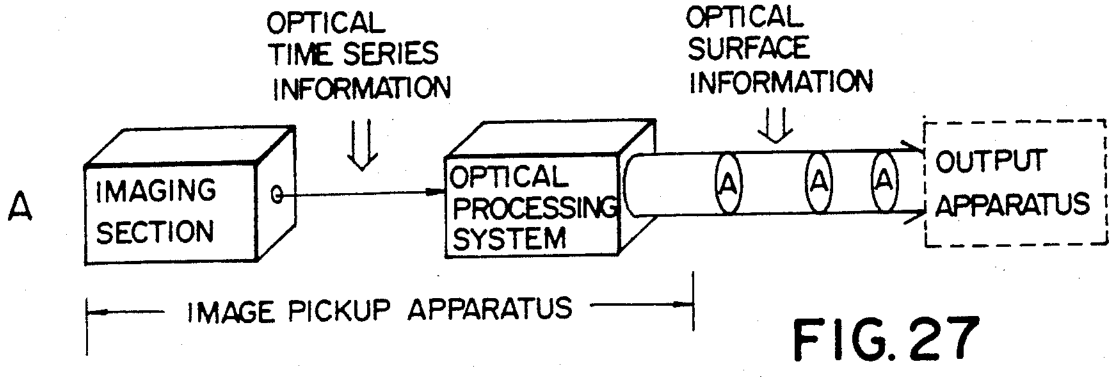
Figure 29:
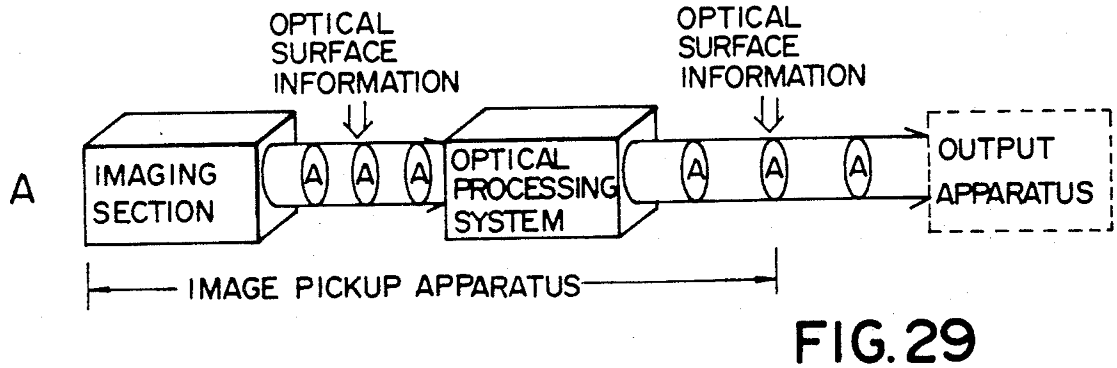

While in the image pickup apparatus shown in FIGS. 26, 27 and 29, the beam generated from the optical processing system (an image processing section) is supplied to the output apparatus as it is.

Figure 30:
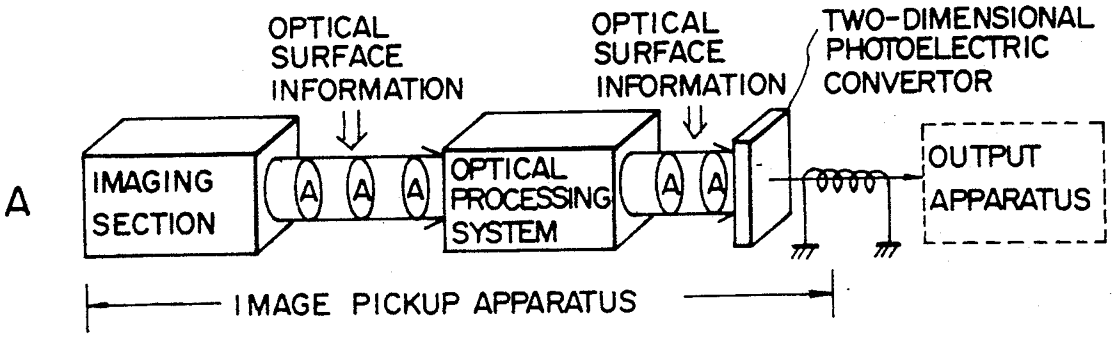
Figure 33:
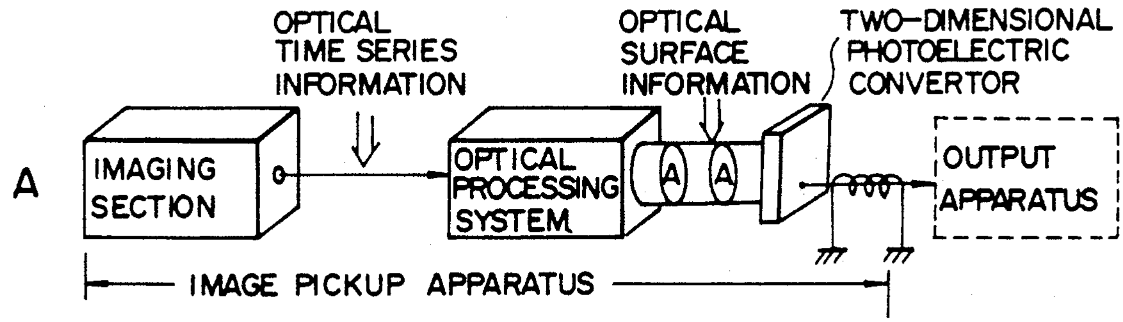

In the image pickup apparatus shown in FIGS. 30 and 33, the electro-magnetic radiation beam carrying circular informations generated from an optical processing system (an imaging section) is photoelectrically converted into electric signals by a two-dimensional senser to supply the signals to the output apparatus.

Figure 31:
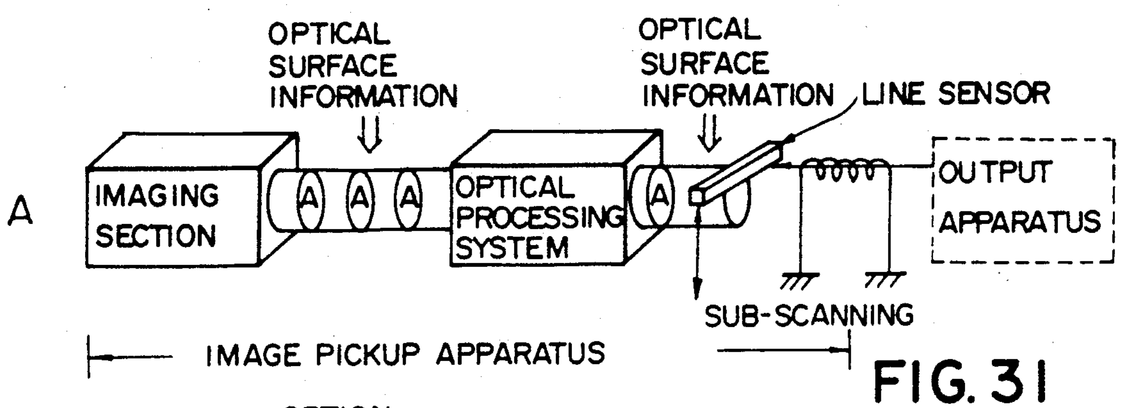
Figure 32:
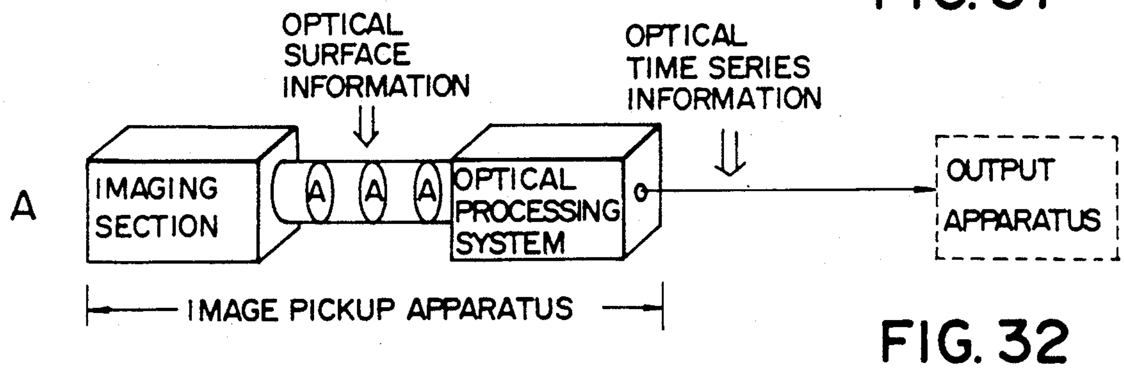
Figure 34:
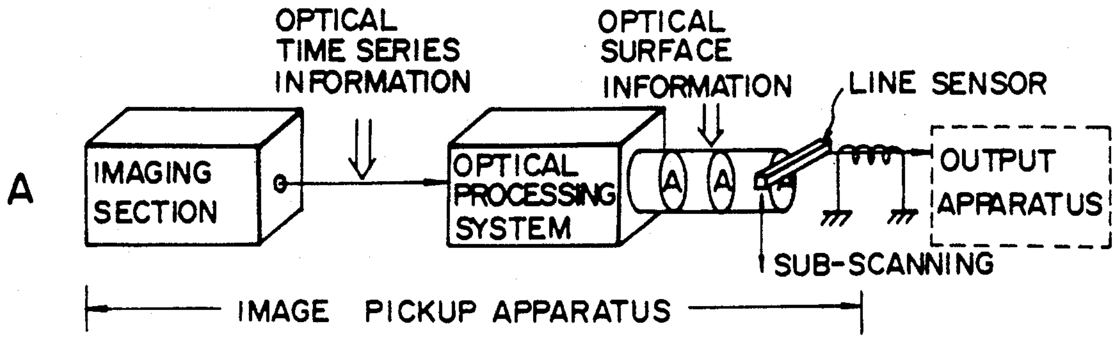

In the image pickup apparatus shown in FIGS. 31 and 34, the electro-magnetic radiation beam carrying circular information generated from an optical processing system (an imaging section) is photoelectrically converted into electric signals by a line sensor which is transferred into a sub scanning direction to supply the signals to the output apparatus.

As is understood by the foregoing description, in the image information processing method and the apparatus thereof, the intensity of the image information carried by the electro-magnetic radiation beam is adjusted by varying the intensity of the electro-magnetic radiation beam which is to read out the information recorded on the photo-to-photo converting element as the charge image.

The image information carried by the electro-magnetic radiation beam which is read out as it is from the photo-to-photo converting element is inverted or non-linearly processed. Therefore, the image information with extremely high resolution is processed by the apparatus with a simple configuration.

What is claimed is:

1. A method of adjusting an intensity of an image information, comprising the steps of:

arranging a photo-to-photo transducer including, at least, a photoconductive layer member and a photo-modulation layer member interposed between two electrodes;

projecting an electro-magnetic radiation beam carrying an image information onto said photo-to-photo transducer through one of said electrodes at a side of said photoconductive layer member;

projecting an electro-magnetic radiation beam for reading operation onto said photo-to-photo transducer through said other electrode at a side of said photo-modulation layer member; and varying the intensity of said electro-magnetic radiation beam for reading operation accordingly with the intensity of said electro-magnetic radiation beam carrying the image information.

2. A method of inverting a polarity of an image information, comprising the steps of:

arranging a photo-to-photo transducer including, at least, a photoconductive layer member and a photo-modulation layer member interposed between two electrodes;

projecting an electro-magnetic radiation beam carrying an image information onto said photo-to-photo transducer through one of said electrodes at a side of said photoconductive layer member; and projecting an electro-magnetic radiation beam for reading operation onto said photo-to-photo transducer through said other electrode at a side of said photo-modulation layer member; and varying a voltage applied across said electrodes to change an optating range of said photo-modulation layer member on the generated beam-to-applied voltage characteristic thereof to rotate the plane of polarization of said electro-magnetic radiation beam for reading operation.

3. A method of nonlinearly processing an image information, comprising the steps of:

arranging a photo-to-photo transducer including, at least, a photoconductive layer member and a photo-modulation layer member interposed between two electrodes;

projecting an electro-magnetic radiation beam carrying an image information onto said photo-to-photo transducer through one of said electrodes at a side of said photoconductive layer member;

projecting an electro-magnetic radiation beam for reading operation onto said photo-to-photo transducer through another of said electrodes at a side of said photo-modulation layer member; and varying a voltage applied across said electrodes to change an operating range of said photo-modulation layer member from a linear region to a non-linear region of said photo-modulation layer member to cause a nonlinear relationship between said electro-magnetic radiation beam for reading operation and said electro-magnetic radiation beam carrying the image information.

4. A method of nonlinearly processing an image information, comprising the steps of:

arranging a photo-to-photo transducer including, at least, a photoconductive layer member and a photo-modulation layer member interposed between two electrodes;

projecting an electro-magnetic radiation beam carrying an image information onto said photo-to-photo transducer through one of said electrodes at a side of said photoconductive layer member;

projecting an electro-magnetic radiation beam for reading operation onto said photo-to-photo transducer through another of said electrodes at a side of said photo-modulation layer member; and adjusting an intensity of the electro-magnetic radiation beam carrying the information for selecting an operating range of said photoconductive layer member from linear and nonlinear ranges thereof with respect to the electro-magnetic radiation beam incident thereto.

5. A method of enhancing a contour of an image information, comprising the steps of:

arranging a first and a second photo-to-photo transducers each including, at least, a photoconductive layer member and a photo-modulation layer member interposed between two electrodes;

projecting an electro-magnetic radiation beam carrying an image information onto said first and second photo-to-photo transducers respectively through one of said electrodes at a side of said photoconductive layer member;

projecting an electro-magnetic radiation beam for reading operation onto said first and second photo-to-photo transducers respectively through another of said electrodes at a side of said photo-modulation layer member and producing a first and second beams;

inverting an image polarity of said first beam and attenuating high space frequency components thereof and producing a third beam, a polarity thereof being opposite to that of the first beam;

superimposing said first and third beams each other and produce a fourth beam; and superimposing said fourth beam onto said electro-magnetic radiation beam carrying the image information and producing a contour enhanced image information.

6. An apparatus for adjusting an intensity of an image information, comprising:

transducing means including, at least, a photoconductive layer member and a photo-modulation layer member interposed between two electrodes for photo-to-photo transducing;

first projecting means for projecting an electro-magnetic radiation beam carrying an image information onto said transducing means through one of said electrodes at a side of said photoconductive layer member;

second projecting means for projecting an electro-magnetic radiation beam for reading operation onto said transducing means through another of said electrodes at a side of said photo-modulation layer member; and adjusting means for adjusting the intensity of said electro-magnetic radiation beam for reading operation, thus original intensity of said electro-magnetic radiation beam carrying the image information is adjusted.

7. An apparatus for inverting a polarity of an image information, comprising:

transducing means including, at least, a photoconductive layer member and a photo-modulation layer member interposed between two electrodes for photo-to-photo transducing;

first projecting means for projecting an electro-magnetic radiation beam carrying an image information onto said transducing means through one of said electrodes at a side of said photoconductive layer member;

second projecting means for projecting an electro-magnetic radiation beam for reading operation onto said transducing means through another of said electrodes at a side of said photo-modulation layer member; and varying means for varying a voltage applied across said electrodes, thus an operating range of said photo-modulation layer member on the generated beam-to-applied voltage characteristic thereof is changed to rotate the plane of polarization of said electro-magnetic radiation beam for reading operation.

8. An apparatus for nonlinearly processing an image information, comprising;

transducing means including, at least, a photoconductive layer member and a photo-modulation layer member interposed between two electrodes for photo-to-photo transducing;

first projecting means for projecting an electro-magnetic radiation beam carrying an image information onto said transducing means through one of said electrodes at a side of said photoconductive layer member;

second projecting means for projecting an electro-magnetic radiation beam for reading operation onto said transducing means through another of said electrodes at a side of said photo-modulation layer member; and varying means for varying a voltage applied across said electrodes, thus an operating range of said photo-modulation layer member is changed from a linear region to a non-linear region of said photo-modulation layer member to cause a nonlinear relationship between said electro-magnetic radiation beam for reading and said electro-magnetic radiation beam carrying an image information.

9. An apparatus for nonlinearly processing an image information, comprising:

transducing means including, at least, a photoconductive layer member and a photo-modulation layer member interposed between two electrodes for photo-to-photo transducing;

first projecting means for projecting an electro-magnetic radiation beam carrying an image information onto said transducing means through one of said electrodes at a side of said photoconductive layer member;

second projecting means for projecting an electro-magnetic radiation beam for reading operation onto said transducing means through another of said electrodes at a side of said photo-modulation layer member; and adjusting means for adjusting an intensity of the electro-magnetic radiation beam carrying an image information, thus an operating range of said photoconductive layer member is selected from linear and nonlinear ranges thereof with respect to the electro-magnetic radiation beam incident thereto.

10. An apparatus for enhancing the contour of an image information, comprising:

first and second transducing means each including, at least, a photoconductive layer member and a photo-modulation layer member interposed between two electrodes for photo-to-photo transducing;

first projecting means for projecting an electro-magnetic radiation beam carrying an image information onto said first and second transducing means respectively through one of said electrodes at a side of said photoconductive layer member;

second projecting means for projecting an electro-magnetic radiation beam for reading operation onto said first and second transducing means respectively through another of said electrodes at a side of said photo-modulation layer member for producing a first and second beams;

inverting means for inverting an image polarity of said first beam;

attenuating means for attenuating high space frequency components of said first beam for producing a third beam, a polarity thereof being opposite to that of the first beam;

first superimposing means for superimposing said first and third beams each other for producing a fourth beam; and second superimposing means for superimposing said fourth beam onto said electro-magnetic radiation beam carrying the image information, thus a contour enhanced image information is produced.

* * * * *